(12) United States Patent
Takahashi et al.

(10) Patent No.: US 9,605,090 B2
(45) Date of Patent: Mar. 28, 2017

(54) ACTIVATED CLAY FOR TREATING AROMATIC HYDROCARBONS

(71) Applicant: MIZUSAWA INDUSTRIAL CHEMICALS, LTD., Tokyo (JP)

(72) Inventors: Noriyuki Takahashi, Tokyo (JP); Yasuo Saitoh, Tokyo (JP)

(73) Assignee: Mizusawa Industrial Chemicals, Ltd., Tokyo (JP)

(*) Notice: Subject to any disclaimer, the term of this patent is extended or adjusted under 35 U.S.C. 154(b) by 276 days.

(21) Appl. No.: 14/416,179

(22) PCT Filed: Jul. 22, 2013

(86) PCT No.: PCT/JP2013/069791
§ 371 (c)(1),
(2) Date: Jan. 21, 2015

(87) PCT Pub. No.: WO2014/030477
PCT Pub. Date: Feb. 27, 2014

(65) Prior Publication Data
US 2015/0203603 A1 Jul. 23, 2015

(30) Foreign Application Priority Data

Aug. 23, 2012 (JP) ................................. 2012-184021

(51) Int. Cl.

| | |
|---|---|
| *B01J 21/16* | (2006.01) |
| *C08F 4/58* | (2006.01) |
| *B01J 37/06* | (2006.01) |
| *B01J 35/00* | (2006.01) |
| *C10G 45/68* | (2006.01) |
| *B01J 35/10* | (2006.01) |
| *B01J 35/02* | (2006.01) |
| *B01J 20/12* | (2006.01) |
| *C10G 45/04* | (2006.01) |

(52) U.S. Cl.
CPC ................ *C08F 4/58* (2013.01); *B01J 21/16* (2013.01); *B01J 35/002* (2013.01); *B01J 37/06* (2013.01); *C10G 45/68* (2013.01); *B01J 20/12* (2013.01); *B01J 35/02* (2013.01); *B01J 35/10* (2013.01); *C10G 45/04* (2013.01)

(58) Field of Classification Search
CPC ... B01J 21/16; B01J 35/10; B01J 20/12; B01J 35/002; C10G 45/04; C10G 45/68
See application file for complete search history.

(56) References Cited

U.S. PATENT DOCUMENTS

| | | | |
|---|---|---|---|
| 2,466,047 A * | 4/1949 | Shabaker | ................. B01J 21/16 502/80 |
| 3,787,330 A * | 1/1974 | Sugahara | ............. C10G 25/003 423/335 |
| 5,330,946 A | 7/1994 | Hynes et al. | |
| 6,120,595 A | 9/2000 | Kojima et al. | |
| 6,602,816 B1 | 8/2003 | Hatano et al. | |
| 2011/0166011 A1 | 7/2011 | Hatano et al. | |
| 2012/0000819 A1 | 1/2012 | Matsushita | |

FOREIGN PATENT DOCUMENTS

| | | |
|---|---|---|
| JP | 64-061310 A | 3/1989 |
| JP | 6-263431 A | 9/1994 |
| JP | 11-179202 A | 7/1999 |
| JP | 2000-344513 A | 12/2000 |
| JP | 2010-095436 A | 4/2010 |
| WO | WO 2010/116603 A1 | 10/2010 |

OTHER PUBLICATIONS

International Search Report issued in PCT/JP2013/069791, mailed on Oct. 29, 2013.

* cited by examiner

*Primary Examiner* — Elizabeth Wood
(74) *Attorney, Agent, or Firm* — Birch, Stewart, Kolasch & Birch, LLP

(57) ABSTRACT

An activated clay for treating aromatic hydrocarbons, containing montmorillonite in an amount of not less than 34% by mass, having an $SiO_2/Al_2O_3$ mol ratio in a range of 3.8 to 8.0, and desorbing ammonia in an amount in a range of 0.11 to 0.20 mmols/g as measured by the ammonia TPD method with the heat of adsorption in a range of 128 to 148 kJ/mol. The activated clay comprises an acid-treated product of smectite clay, imposes no limitation on the area where the starting clay is produced, and features long catalytic life free of dispersion in the properties.

1 Claim, 1 Drawing Sheet

ACTIVATED CLAY FOR TREATING AROMATIC HYDROCARBONS

TECHNICAL FIELD

This invention relates to an activated clay for treating aromatic hydrocarbons and, more specifically, to an activated clay that is used for refining aromatic hydrocarbons such as BTXs (benzene, toluene, xylene) featuring particularly excellent life.

BACKGROUND ART

Aromatic hydrocarbons such as BTXs have heretofore been put to the refining treatment in order to remove unsaturated hydrocarbon compounds such as olefins and diolefins therefrom. The refining treatment is to remove, from the aromatic hydrocarbons, the unsaturated compounds such as BTXs as high-boiling fractions of distillate by polymerizing them into dimers or trimers thereof or by alkylating them into aromatic hydrocarbons so as to transform them into polycyclic aromatic compounds of high molecular weights. It has been known that during these reactions, there takes place disproportionation reaction or isomerization reaction of the alkylaromatic compounds such as toluene and xylene.

The activated clay has heretofore been used for the refining treatment from such a standpoint that it works as catalyst for polymerizing unsaturated hydrocarbons (see, for example, patent documents 1 and 2). Though the activated clay is used for decolorizing mineral oils, it has been known that the activated clay for decolorization can also be used for the refining of aromatic hydrocarbons (patent documents 3 and 4).

PRIOR ART DOCUMENTS

Patent Documents

Patent document 1: JP-A-6-263431
Patent document 2: JP-A-11-179202
Patent document 3: JP-A-2000-344513
Patent document 4: JP-A-2010-95436

OUTLINE OF THE INVENTION

Problems that the Invention is to Solve

The activated clays described in the above patent documents 1 and 2 are those having improved catalytic properties accompanied, however, by short catalytic life. Besides, there still remain problems such as limited areas where the starting clays are produced and dispersion in the properties leaving room for further improvements.

For instance, the activated clay used in the patent document 1 has a very short catalytic life and its catalytic properties are deteriorated in short periods of time. After all, it cannot satisfy the use of it as a catalyst for refining aromatic hydrocarbons.

The activated clay described in the patent document 2 has a catalytic life that is lengthened to some extent but must contain the $Fe_2O_3$ component at a high concentration. Therefore, there is a problem in that the area where the starting clay is produced is limited to places where iron is contained much (e.g., India). That is, the activated clay is obtained by treating a clay (acid clay) comprising chiefly montmorillonite with an acid and has a large specific surface area. Here, however, the $Fe_2O_3$ component elutes out due to the treatment with the acid. To obtain the activated clay containing the $Fe_2O_3$ component in more than a predetermined amount, therefore, the starting clay (acid clay) that is to be treated with the acid must contain the $Fe_2O_3$ component in large amounts. Therefore, the place of production is limited to, for example, India.

The activated clays of the patent documents 3 and 4 have very excellent properties for decolorizing mineral oils but their catalytic lives are not sufficiently long if they are used for refining the aromatic hydrocarbons. Further these activated clays contain a solid acid of an acidity of Ho≤−3.0 in amounts lying in a predetermined range. Specifying the amount of the solid acid over a wide range acidity distribution invites a defect in that properties of the catalyst tends to be dispersed during the treatment for refining the aromatic hydrocarbons since it is difficult to properly grasp a specific distribution of acidities that contributes to the catalytic function or is difficult to properly grasp the amount of the solid acid over the wide range of acidity distribution.

It is, therefore, an object of the present invention to provide an activated clay for treating aromatic hydrocarbons, which comprises an acid-treated product of smectite clay, without imposing limitation on the area where the starting clay is produced, featuring long catalytic life and free of dispersion in the properties.

Means for Solving the Problems

The present inventors have conducted experiments extensively concerning the catalytic functions of the activated clays in refining the aromatic hydrocarbons and, as a result, discovered the fact that upon setting the degree of treatment with an acid depending on the properties of the starting clay, the amount of the solid acid in a specific range of acidities can be selectively increased and the catalytic life can be greatly extended without lowering the catalytic power, and have completed the invention.

Namely, according to the present invention, there is provided an activated clay for treating aromatic hydrocarbons, containing montmorillonite in an amount of not less than 34% by mass, having an $SiO_2/Al_2O_3$ mol ratio in a range of 3.8 to 8.0, and desorbing ammonia in an amount in a range of 0.11 to 0.20 mmols/g as measured by the ammonia TPD method with the heat of adsorption in a range of 128 to 148 kJ/mol.

Effects of the Invention

The activated clay of the invention does not have to contain at high concentrations such components as heavy metal oxides that are to be removed by the treatment with an acid, but should contain montmorillonite in amounts of not less than 34% by mass. Therefore, there is no limitation on the area where the starting clay is produced or on the working face (place of deposit) thereof, and the montmorillonite produced from any area can be used to produce the activated clay of the present invention through the treatment with an acid.

Further, as will be understood from the range of $SiO_2/Al_2O_3$ mol ratios, the activated clay of the present invention is not obtained by the treatment with an acid of a high concentration but is obtained by the treatment with a considerably weak acid using, for example, the acid of a low concentration. This is because if the treatment is conducted by using the acid of a high concentration, the $Al_2O_3$ elutes out in large amounts and the mol ratio becomes considerably large. For instance, the activated clays of the above-mentioned patent documents 1 to 4 have $SiO_2/Al_2O_3$ mol ratios which are larger than that of the present invention.

Further, the activated clay of the present invention desorbs ammonia in an amount in a predetermined range (0.11 to 0.20 mmols/g) as measured by the ammonia TPD method (with the heat of adsorption in a range of 128 to 148 kJ/mol). Here, the heat of adsorption is related to the strength of the solid acid while the ammonia desorption amount is related to the amount of the solid acid. That is, as described in Example appearing later, the ammonia TPD method measures both the amount of ammonia that desorbs and the temperature simultaneously by causing the ammonia which is a base probe molecule to be adsorbed by the solid matter of the sample while continuously elevating the temperature. The ammonia that is adsorbed by a weakly acidic point drops off at a low temperature (corresponds to the desorption in a range of low heat of adsorption) and the ammonia adsorbed by a strongly acidic point drops off at a high temperature (corresponds to the desorption in a range of high heat of adsorption).

According to the ammonia TPD method, the strength of acid is represented by the temperature and the amount of heat of adsorption without using color reaction. Therefore, the strength of the solid acid and the amount of the solid acid are more correctly obtained than those of the conventional n-butylamine titration method and, hence, the activated clay of the present invention can be properly evaluated for its properties.

Besides, in the present invention, the ammonia desorption amount specified by the ammonia TPD method (related to the amount of the solid acid) lies within the above-mentioned range. Therefore, the activated clay not only has a high catalytic power during the treatment for refining the aromatic hydrocarbons but also exhibits a very long catalytic life which is the greatest advantage of the present invention.

In the treatment for refining the aromatic hydrocarbons such as BTXs, so far, it had been considered that the reactions such as polymerization and alkylation of unsaturated hydrocarbon compounds like olefins and diolefins contained therein are caused by the solid acids in the activated clay and that such reactions are promoted by an increase in the amounts of the solid acids having high acidities. In fact, however, the solid acids that contribute to the reaction are limited to those having acidities within a specific range, and the solid acids having acidities outside the above range promote the side reactions and shortens the catalytic life. According to the present invention, on the other hand, the amounts of the solid acids having acidities lying in a range in which they contribute to the alkylation reaction are selectively increased by properly treating them with an acid and it is allowed to realize a very long catalytic life without impairing the catalytic power (for promoting the alkylation of olefins).

As will be understood from the above description, the treatment with an acid was so far conducted to a degree in excess of a predetermined level based on a simple idea that the activated clay was a cause of an increase in the amounts of the solid acids having high acidities. Therefore, the effect was large in promoting the polymerization of olefins but also accompanied by such an effect that the catalyst was adversely affected by the side reactions presumably, therefore, causing the catalytic life to be rather shortened.

MODE FOR CARRYING OUT THE INVENTION

<Starting Clay>

Figure 1:
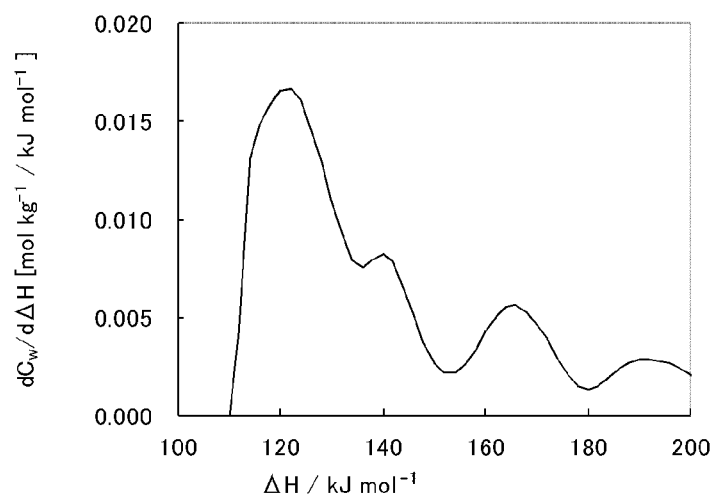
FIG. 1 is a diagram showing the distribution of acidities of an activated clay of the present invention (Example 6).

The montmorillonite which is a main component of the clay used for the production of the activated clay of the invention is a clay mineral that pertains to the smectite of the dioctahedral type, and has a structural unit of three basic layers in which an $AlO_6$ octahedral layer is sandwiched by two $SiO_4$ tetrahedral layers, part of Al in the $AlO_6$ octahedral layer being isomorphously substituted with Fe or Mg and part of Si in the $SiO_4$ tetrahedral layers being isomorphously substituted with Al. Further, the units of these basic layers are laminated in the direction of c-axis, and cations are present among the basic layers in a form to compensate for the lack of electric charge caused by the isomorphous substitution.

That is, if the clay comprising chiefly the montmorillonite having the above laminated layer structure is treated with an acid, the cations present among the layers of the laminated structure elute out and the structure of the basic three layers is partly cut and is broken into pieces causing the $AlO_6$ octahedral layer to elute out starting from an end of the structure of three basic layers. At the end, too, is formed a structure that exhibits properties of a solid acid. Further, the specific surface area increases accompanying the treatment with the acid and the $SiO_2/Al_2O_3$ mol ratio, too, increases due to the elution of the Al component.

It is considered that the above-mentioned montmorillonite is formed as the volcanic ash or the lava undergoes the metamorphism under the influence of sea water. In Japan, the montmorillonite is produced in large amounts as acid clay (the name comes from the fact that it exhibits acidity if it is suspended in a saline solution). In addition to the above, however, it is also allowable to use any of sodium-type bentonite, calcium-type bentonite, magnesium-type bentonite, sub-bentonite, nontronite, beidellite, and fuller's earth.

Representative starting clays that can be used for producing the activated clay of the present invention have chemical compositions which are roughly as described below. No special chemical composition is required provided they contain montmorillonite. Therefore, there is no limitation on the area where they are produced or on the working face.

$SiO_2$: 45 to 65% by mass
$Al_2O_3$: 13 to 25% by mass
MgO: 2 to 7% by mass
CaO: 0.1 to 3.0% by mass
$Fe_2O_3$: 2 to 25% by mass
$K_2O$: 0.1 to 3.0% by mass
$Na_2O$: 0.1 to 3.0% by mass
Ignition loss: 5 to 12% by mass It is important that the starting clay is passed through the refining operation such as gravel/sand separation, ore dressing by floatation, magnetic ore dressing, hydraulic elutriation or air elutriation to remove impurities such as quartz, feldspar and the like from the clay so that the grain size of the clay lies within a given range. This is to easily obtain properties adapted to the activated clay of the invention for treating aromatic hydrocarbons by homogeneously conducting the treatment with an acid that will be described later.

<Treatment with an Acid>

Referring to FIG. 1, the starting clay is treated with an acid to such a degree that the ammonia is desorbed in an amount in a range of 0.11 to 0.20 mmols/g and, specifically, 0.11 to 0.17 mmols/g as measured by the ammonia TPD method with the heat of adsorption in a range of 128 to 148 kJ/mol. That is, the amount of ammonia desorption decreases if the treatment with the acid is either excessive or insufficient, and the catalytic life of the obtained activated clay greatly decreases. Therefore, the degree of the treatment with the acid plays a very important role.

The treatment with the acid is operated in a customary way, such as filling the treating vessel with a suspension of the clay and adding an aqueous solution of acid thereto with stirring.

Further, as will be understood from the above description, the degree of treatment with the acid for attaining the above-mentioned amount of ammonia desorption is smaller than that of the conventional treatment with the acid that is done for obtaining the activated clay for treating aromatic hydrocarbons. As the acid, for instance, there are used mineral acids (sulfuric acid, hydrochloric acid, etc.) and, specifically, there is used the sulfuric acid in an amount of, in the present invention, as small as about 50 to 68 parts by mass in contrast with the traditionally employed amount of about 75 parts by mass per 100 parts by mass of the dry clay. The conditions may be so selected that the ammonia desorption amount is attained as described above, i.e., the treating temperature is selected from a range of 60 to 100° C. and the treating time is selected from a range of 4 to 48 hours.

The acid-treated product thus obtained contains the montmorillonite in an amount of at least not less than 34% by mass. As will be described later in Examples, the content of the montmorillonite can be calculated from a peak intensity of the (001)-plane of the montmorillonite by using the X-ray diffraction.

The thus obtained acid-treated product is washed with water, dried, pulverized, classified, and is adjusted to acquire a particle size that meets the use.

The activated clay that is obtained in a granular form is, as required, heat-treated to increase the strength of the particles. The heat treatment is conducted at a temperature of, usually, 80 to 500° C. and, specifically, 100 to 300° C. for 0.5 to 10 hours and, specifically, about 0.7 to about 5 hours.

<Activated Clay for Treating Aromatic Hydrocarbons>

The activated clay obtained above is used as a catalyst for promoting the polymerization and alkylation of unsaturated hydrocarbon compounds in the treatment for refining the aromatic hydrocarbons.

If, for example, the aromatic hydrocarbons are to be refined batchwise, the activated clay powder is adjusted to possess a median grain size of, usually, 20 to 40 µm and, specifically, 25 to 35 µm. If the activated clay is to be used in a fixed bed, it is adjusted into a granular form having a grain size in a range of, usually, 0.25 to 1.0 mm. The shape of the particles may be any of spherical, granular, cubic, tablet, cylindrical, or amorphous form.

The activated clay contains the montmorillonite in an amount of not less than 34% by mass and, as described already, desorbs ammonia in an amount in a range of 0.11 to 0.20 mmols/g and, specifically, 0.11 to 0.17 mmols/g as measured by the ammonia TPD method with the heat of adsorption in a range of 128 to 148 kJ/mol.

In regard to its composition, further, the activated clay has the $SiO_2/Al_2O_3$ mol ratio in a range of 3.8 to 8.0 and, specifically, 3.8 to 7.0. Namely, if the $SiO_2/Al_2O_3$ mol ratio is either higher or lower than the above range, the amount of ammonia desorption becomes smaller than the above range. As a result, solid oxygen is not obtained in a sufficient amount and the catalytic capability (function for promoting the alkylation of the unsaturated hydrocarbon compounds) becomes unsatisfactory.

As will be described in Examples appearing later, the activated clay of the invention exhibits excellent function as a catalyst for refining unsaturated hydrocarbon compounds such as olefins and diolefins, and features very long catalytic life lending itself well for refining aromatic hydrocarbons.

The activated clay for treating aromatic hydrocarbons can be evaluated for its activity as the refining catalyst and for its catalytic life by finding a bromine index that serves as an index of olefin content in the hydrocarbons that are passed through a layer filled with the granular clay and are, thereafter, distilled to remove high-boiling fractions therefrom.

EXAMPLES

The invention will now be described by way of the following Examples in which measurements were taken according to the methods described below.

(1) Content of the Montmorillonite (Mont.: Quantitative Analysis by XRD).

One gram of a sample was added with a 10 vol % ethylene glycol/ethanol solution and was dried at 50° C. overnight.

By pulverizing the dried sample in a mortar, there was obtained a sample treated with ethylene glycol. The amount of the $\alpha\text{-}Al_2O_3$ to be added to the sample was determined by so adjusting the blending ratio that the area intensities were nearly the same between the diffraction peak 2 $\theta$=5 [deg] of the sample to be measured and the diffraction peak 2 $\theta$=43.3 [deg] of the $\alpha\text{-}Al_2O_3$ to be measured.

By using a vibration mill, the mixture was shaken together with alumina balls at 50 Hz for 20 minutes so as to be homogenized.

Depending on the range of measuring angles, the sample was filled in a holder according to the NBS method ["Standard X-ray diffraction powder patterns", NBS Monograph, 25 (1971)] and was quantitatively measured.

The measurements were taken under the conditions of 2 $\theta$=3-7, 20-27.5 and 42-44.5 [deg], a voltage of 40 [V], a current of 40 [mA], D slit & S Slit: 2/3, V Slit: 10 [mm], R Slit: 0.3 [mm] and Step: 0.02 [deg].

By using the montmorillonite (Kunipia F treated with ethylene glycol) as the standard substance, the samples were calculated for their relative area intensity ratios (%) according to the matrix flushing method which was a kind of the internal standard method by setting the peak area in the X-ray diffraction diagram to be 220% to regard them as the montmorillonite contents.

(2) SAR ($SiO_2/Al_2O_3$ mol Ratio).

By regarding the elements of Si and Al as oxides thereof, the $SiO_2/Al_2O_3$ mol ratios were found from the results measured by the powder filter paper method XRF.

(3) Amount of Ammonia Desorption (Ammonia TPD Method).

About 0.1 g of the sample was set in a quartz cell (inner diameter of 10 mm) of a temperature-elevating desorption apparatus, Model TPD-AT-1 manufactured by Nihon Bell Co., heated up to 383 K at a rate of 10 K min$^{-1}$ while flowing $O_2$ (60 cm$^3$ min$^{-1}$, 1 atm), and the temperature that was reached was maintained for one hour. Thereafter, the sample was left to cool down to 373 K while flowing $O_2$ followed by deaeration in vacuum. Thereafter, $NH_3$ of 100 Torr was introduced so as to be adsorbed for 30 minutes followed by the deaeration for 30 minutes and the treatment with the steam.

The treatment with the steam consisted of repeating the cycle of introducing the steam of 100° C. and a steam pressure of about 25 Torr, maintaining this state for 30 minutes followed by the deaeration for 30 minutes, and introducing the steam again for 30 minutes followed by the dearation for 30 minutes. Thereafter, He was flown in an amount of 0.041 mmols s$^{-1}$ under a reduced pressure (100 Torr, 13.3 kPa) and, after the temperature of 100° C. was maintained for 30 minutes, the sample bed was heated up to 1073 K at a rate of 10 K min$^{-1}$. The gas at the outlet was analyzed by using a mass analyzer (ANELVA M-QA 100 F). W/F was 13 kgs m$^{-3}$.

In taking the measurement, mass spectra were recorded at a mass number (m/e) 16. After the mass spectra have been recorded, a 1 mol % NH$_3$/He standard gas was further diluted with helium, and was flown through a detector in a manner that the NH$_3$ concentrations were 0, 0.1, 0.2, 0.3, and 0.4 mol % and the total flow rate was 0.041 mmols s$^{-1}$. The spectra were recorded to prepare a calibration curve of ammonia, and the intensities of the detector were corrected.

The obtained TPD spectra were converted into a distribution of acid intensities (Cw/ΔH) according to the report prepared by the Graduate School of Tottori University, Faculty of Engineering, Depart of Engineering, 40, 23 (2009).

(4) Oil Flowing Test.

The aromatic hydrocarbon components were measured in accordance with the JIS K 2536-3 by using a gas chromatograph GC-2010 manufactured by SHIMADZU Co. The bromine index (Br-Index, hereinafter abbreviated as BI) was measured by using a coulometric titration type BR-7 manufactured by Hiranuma Sangyo Co.

Table 1 shows the components of the sample oil. BI (BI$_0$) of the sample oil was 646.

TABLE 1

| Compound | Content (mass %) |
| --- | --- |
| Benzene | 0.0 |
| Toluene | 0.0 |
| Ethyl benzene | 9.3 |
| p-Xylene | 11.1 |
| m-Xylene | 24.9 |
| o-Xylene | 16.1 |
| C$_9$ | 33 |
| C$_{10}$ | 4.3 |
| C$_{11}$ | 0.3 |
| C$_{12}$ | 0.2 |
| C$_{13}$ | 0.1 |
| C$_{14}$ | 0.7 |

The oil flowing test was conducted after the sample was dressed by using a sieve of 24 to 60 meshes and was dried at 150° C. for 3 hours. One gram of the sample was filled in a sample tube of I.D. φ=10 mm, and the oil was flown therethrough under the conditions of a temperature of 180° C., a pressure of 1.5 MPa and WHSV=2 h$^{-1}$. The oil collected from the outlet of the sample tube every 12 hours was measured for its BI, and the obtained break through curve was analyzed according to the following formula described in A. Wheeler & A. J. Robell, J. Catal., 13, 299 (1969) to find $t_s$.

$$\ln\frac{BI}{BI_0} = -r\ln\left\{1 - \exp\left(\frac{-N_T t}{t_s}\right) + \exp\left[N_T - \frac{N_T t}{t_s}\right]\right\} \quad \text{[Numerical 1]}$$

$$r = k_0/k_A$$

$$N_T = \frac{k_A W}{F} = \frac{k_A}{(WHSV)}$$

$$t_s = \frac{WW_s}{F(BI_0)}$$

where,
BI$_0$: BI [mg/100 g] at the inlet,
BI: BI [mg/100 g] at the outlet after a time t,
k$_0$: Primary reaction rate constant [1/hr] of the initial catalyst and is a value of not larger than Ka,
k$_A$: Olefin adsorption rate constant [1/hr],
W: Mass of the catalyst [g],
F: Oil flow rate [g/hr],
Ws: Weight of the high-boiling olefin adsorbed per the weight of the catalyst after a time is [mg/100 g],
WHSV: Space velocity [1/hr].

Comparative Example 1

A commercially available activated clay (F-124 manufactured by BASF Co.) was used. Measurements were taken to obtain the results as shown in Table 3.

Example 1

Figure 2:
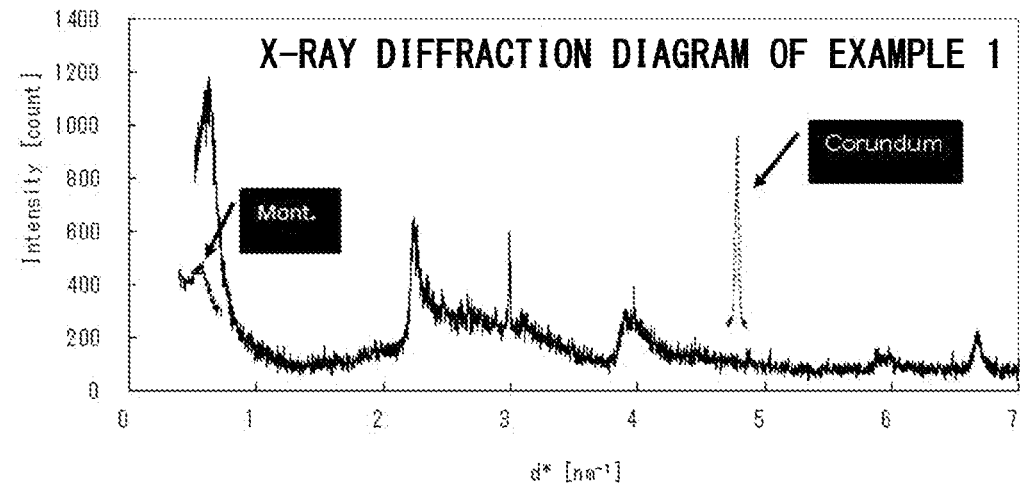
FIG. 2 is a diagram showing an X-ray diffraction image of an activated clay of the present invention (Example 1).

A starting clay produced in the area A was blended with water so that the concentration thereof was 2% by mass, and was dispersed with stirring, passed through a sieve of an aperture of 45 μm to remove sand and the like of not smaller than 45 μm (the treatment up to this step is regarded to be a sieving treatment; this holds true for different starting clays, too). After having recovered silt particles of 2 to 45 μm by hydraulic elutriation, the starting clay was centrifugally separated so as to be refined. Water was added to the refined starting clay to obtain 351 g of a suspension thereof containing 88.6% of water. The sulfuric acid of a concentration of 75% was added to the suspension. Here, the sulfuric acid of a concentration of 75 mass % was added such that the ratio of the sulfuric acid (H$_2$SO$_4$) was 68 parts by mass per 100 parts by mass of the dry clay (hereinafter H$_2$SO$_4$/Clay if this ratio is to be shown) and that the concentration of the sulfuric acid was 4.0 mass % per the whole solution (hereinafter H$_2$SO$_4$/Liquid if this ratio is to be shown). After the addition of the sulfuric acid, the mixture was heated at 90° C. with stirring for 24 hours. Thereafter, the mixture was treated with the sulfuric acid of a concentration of 0.5 mass % and of an amount the same as that of the slurry to prevent hydrolysis. The mixture was then washed with water, dried and coarsely pulverized to obtain an activated clay. The treatment with the acid was conducted under the conditions shown in Table 2, and the obtained activated clay was measured for its properties to obtain the results as shown in Table 3. FIG. 2 is an X-ray diffraction diagram thereof.

Comparative Example 2

A starting clay produced in the area B was used. After the sieving treatment, the starting clay was refined by being centrifugally separated. Thereafter, the starting clay was treated with the acid in the same manner as in Example 1 but changing the conditions of the acid-treatment as shown in Table 2 to obtain an activated clay. The obtained activated clay was measured for its properties to obtain the results as shown in Table 3.

Comparative Example 3

The starting clay produced in the area B was used after having removed the opal contained therein by dissolving it with the caustic soda. After the sieving treatment, silt particles of 2 to 45 μm were recovered by hydraulic elutriation. Thereafter, the starting clay was centrifugally separated and freeze-dried so as to be refined. The starting clay was treated with the acid in the same manner as in Example 1 but changing the conditions of the acid-treatment as shown in Table 2 to obtain an activated clay. The obtained activated clay was measured for its properties to obtain the results as shown in Table 3.

Example 2

After the sieving treatment in Comparative Example 3, particles of not smaller than 2 μm were removed by hydraulic elutriation and, thereafter, the starting clay was refined by being centrifugally separated. Thereafter, the starting clay was treated with the acid in the same manner as in Example 1 but changing the conditions of the acid-treatment as shown in Table 2 to obtain an activated clay. The obtained activated clay was measured for its properties to obtain the results as shown in Table 3.

Comparative Example 4

A starting clay produced in the area C was used. After the sieving treatment, particles of not smaller than 2 μm were removed by hydraulic elutriation. The liquid that was recovered was centrifugally separated, and there was obtained the clay of 0.3 to 2 μm. The starting clay was, thereafter, treated with the acid in the same manner as in Example 1 but changing the conditions of the acid-treatment as shown in Table 2 to obtain an activated clay. The obtained activated clay was measured for its properties to obtain the results as shown in Table 3.

Example 3

An activated clay was obtained in the same manner as in Comparative Example 4 but changing the conditions of the acid-treatment as shown in Table 2 to obtain an activated clay. The obtained activated clay was measured for its properties to obtain the results as shown in Table 3.

Example 4

In Comparative Example 4, the operation was conducted in the same manner up to the step of refining the starting clay. Thereafter, the treatment with the acid was conducted under the conditions shown in Table 2. Here, however, the treatment with the acid was conducted by, first, so feeding the sulfuric acid that its amount was $H_2SO_4$/Liquid=4.0 mass % and then adding the remaining sulfuric acid after 6 hours have passed (total $H_2SO_4$/Liquid=4.6 mass %). The treatment with the acid was conducted at 90° C. with stirring for a total time of 24 hours. Thereafter, the treatment was conducted in the same manner as in Comparative Example 4 to obtain an activated clay. The obtained activated clay was measured for its properties to obtain the results as shown in Table 3.

Example 5

An activated clay was obtained in the same manner as in Example 3 but using a starting clay produced in the area D. The obtained activated clay was measured for its properties to obtain the results as shown in Table 3.

Example 6

A starting clay produced in the area E was used after having treated it with $NaHCO_3$ to turn it into an activated bentonite. In other respects, the operation was carried out in the same manner as in Example 3 to obtain an activated clay. The obtained activated clay was measured for its properties to obtain the results as shown in Table 3. FIG. 1 shows an acid strength distribution thereof.

TABLE 2

|  | Sieving [μm] | $H_2SO_4$/Clay [mass parts] | $H_2SO_4$/Liquid [mass %] |
| --- | --- | --- | --- |
| Example 1 | 2 to 45 | 68 | 4.0 |
| Comp. Ex. 2 | <45 | 64 | 5.2 |
| Comp. Ex. 3 | 2 to 45 | 68 | 4.0 |
| Example 2 | <2 | 58 | 4.0 |
| Comp. Ex. 4 | 0.3 to 2 | 89 | 9.9 |
| Example 3 | 0.3 to 2 | 58 | 4.0 |
| Example 4 | 0.3 to 2 | 68 | 4.6* |
| Example 5 | 0.3 to 2 | 58 | 4.0 |
| Example 6 | 0.3 to 2 | 58 | 4.0 |

*Final sulfuric acid concentration.

TABLE 3

|  | Mont. [mass] | SAR [—] | Amount of $NH_3$ desorption [mmols/g] | Adsorption time until saturated $t_s$ [hr] |
| --- | --- | --- | --- | --- |
| Comp. Ex. 1 | 31 | 6.2 | 0.14 | 776 |
| Example 1 | 36 | 6.1 | 0.12 | 795 |
| Comp. Ex. 2 | 16 | 9.9 | 0.07 | 621 |
| Comp. Ex. 3 | 40 | 5.1 | 0.08 | 770 |
| Example 2 | 53 | 5.1 | 0.11 | 795 |
| Comp. Ex. 4 | 20 | 7.3 | 0.09 | 652 |
| Example 3 | 55 | 4.4 | 0.14 | 876 |
| Example 4 | 52 | 4.6 | 0.14 | 885 |
| Example 5 | 59 | 4.0 | 0.11 | 972 |
| Example 6 | 66 | 4.6 | 0.16 | 822 |

The invention claimed is:
1. An activated clay for treating aromatic hydrocarbons, containing montmorillonite in an amount of not less than 34% by mass, having an $SiO_2/Al_2O_3$ mol ratio in a range of 3.8 to 8.0, and desorbing ammonia in an amount in a range of 0.11 to 0.20 mmols/g as measured by the ammonia TPD method with the heat of adsorption in a range of 128 to 148 kJ/mol.

* * * * *